May 26, 1964  R. N. IVERSEN  3,134,611
HYDRAULIC NOISE SUPPRESSOR
Filed Jan. 3, 1961  2 Sheets-Sheet 1

INVENTOR.
RICHARD N. IVERSEN
BY
RICHEY, McNENNY & FARRINGTON
Donald V. Farrington
ATTORNEYS May 26, 1964   R. N. IVERSEN   3,134,611
HYDRAULIC NOISE SUPPRESSOR
Filed Jan. 3, 1961
2 Sheets-Sheet 2

INVENTOR.
RICHARD N. IVERSEN
BY
RICHEY, McNENNY & FARRINGTON
ATTORNEYS

United States Patent Office 3,134,611
Patented May 26, 1964

3,134,611
HYDRAULIC NOISE SUPPRESSOR
Richard N. Iversen, Mayfield Heights, Ohio, assignor to The Weatherhead Company, Cleveland, Ohio, a corporation of Ohio
Filed Jan. 3, 1961, Ser. No. 80,107
4 Claims. (Cl. 285—54)

This invention relates to the suppression or elimination of noise generated in certain fluid pressure systems. Many fluid systems employ a positive displacement pump connected to a fluid servomotor such as a piston and cylinder or the like. It has been found that when a system of this sort is operated at high pressures, the pulses of the pump introduced into the conduit connecting the pump to the motor result in objectionable noise. A typical example of a system wherein this problem arises is in the hydraulic power steering system of a vehicle wherein a positive displacement pump is driven by the engine and a conduit connects the discharge end of the pump to a servomechanism that actuates the vehicle steering assembly in response to signals from the steering wheel.

It has been proposed to prevent the generation of noise in the aforesaid as well as other types of fluid pressure systems by introducing into the pressure line a length of rubber hose connecting the pump and fluid motor. This rubber hose is arranged so that it can expand radially and thereby serve to reduce or dampen out noise pulses that would otherwise be transmitted along the conduit. Such as assembly incorporating a rubber or rubber-like hose section presents a particularly serious objection in a power steering unit of a vehicle, for example, because rubber hose sections are relatively weak as compared to copper or steel tubes or pipes. If such rubber hose sections are made flexible enough to accomplish their purpose in suppressing or reducing noise pulses, their safety factor against bursting may be so low as to render them unsatisfactory. There is also the passenger safety involved. Even though the power steering unit has a mechanical override or safety follow up device, the bursting of the rubber hose section can cause a sudden variation in steering action and thus be the cause of an accident. The burst hose discharges hydraulic fluid on the hot engine and creates a serious fire hazard.

With the present invention, these objections are not present because the system employs a high pressure conduit that is basically made of metal tubes or pipes. By providing a certain kind of joint between two metal pipe sections it has been found possible to obtain fully as good noise suppression as that provided by less dependable methods such as in incorporating rubber hose sections, while maintaining the superior strength and safeness of operation characteristic of metal pipes or tubes.

Briefly these results are achieved by forming the high pressure conduit so as to include two metal fluid conducting members and a noise insulating joint therebetween. The outer free ends of these metal members are respectively connected to the pump and to the steering mechanism. The inner or adjacent ends are joined by means of a rubber sleeve which is backed up by a metal conduit portion that is crimped to deform the sleeve and cause the rubber material of the sleeve to be confined in a manner to resiliently grip the fluid conducting members.

With this construction the joint serves two functions. First, it aids in the suppression of noise that would otherwise be created and transmitted along the metal pipe from the pump to the steering mechanism and hence to the steering column and frame of the vehicle, since the rubber sleeve prevents metal-to-metal contact between the two conduit sections and acts as a sound deadener to damp out noise pulses passing between the two sections. Second, the joint is arranged to allow the resonant frequency of the conduit to vary slightly so that no sharp resonant frequencies are generated and transmitted to the steering mechanism and frame of the vehicle. The higher frequencies are largely damped out, and that noise which remains lies in a relatively low frequency range which is not objectionable to the human ear as compared to the high pitched chattering noise characteristic of solid metal pipe connections. Finally, the assembly or conduit construction of this invention, including the joint, accommodates both relative axial and rotational or torsional movement of the pipe or conduit members as they are subjected to fluid and mechanical forces applied to the conduit assembly.

The noise suppressing action is augmented by introducing a change in pipe diameter or sectional area at the joint. This change in diameter has been found to reduce or attenuate the transmission of noise through the conduit by breaking up what would otherwise be uniform noise pulses in the column of fluid flowing within the conduit. Thus, the assembly of this invention not only prevents the generation of noise in the conduit, but also suppresses the noise generated in other parts of the fluid system.

Another feature of the invention relates specifically to the composite rubber and metal joint between the conduits. In the preferred embodiment of the invention, this joint is formed by telescoping together tubular metal parts with a rubber sleeve therebetween and crimping the outer metal part to locally deform the rubber sleeve and cause it to grip both metal parts. However, as will be seen in the detailed description of the invention, it is also possible to form a joint between two pipes or tubes by means of a third metal member or sleeve that is crimped against the rubber sleeve. Since the inner metal part or pipe is most conveniently made smooth, a good firm gripping action by the rubber sleeve against the smooth inner tube is required, and this is assured by a novel method of crimping the outer metal tube or sleeve by a joint wherein three or more crimps are formed. Briefly, the crimped joint is made by first crimping the outer metal tube or sleeve toward the ends of the rubber sleeve, after which one or more additional crimps are made between the previously completed end crimps. With this method of crimping, the material of the rubber sleeve is axially confined near the ends of the sleeve, so that the intermediate crimp or crimps tend to compress the rubber and create powerful deforming and gripping forces in the rubber sleeve to provide a strong joint with the smooth inner pipe. It is not necessary that both ends of the joint be crimped simultaneously, so long as terminal portions are crimped before the intermediate crimps are made.

The manner in which these improvements may be attained will become apparent to those skilled in the art from a reading of the following detailed description of the preferred embodiment of the invention and several modifications thereof.

Figure 1:
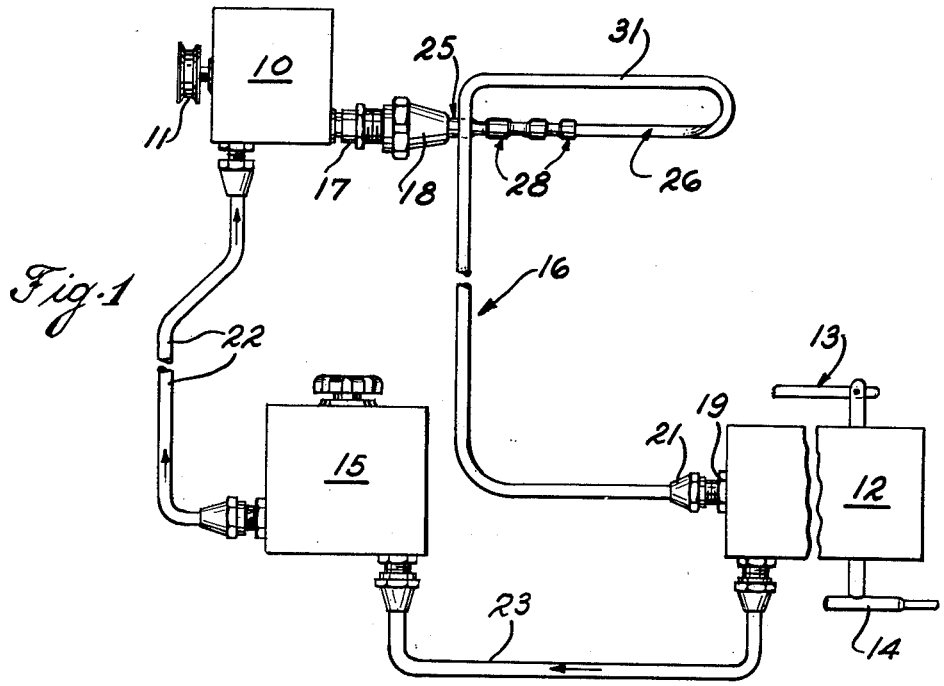
FIG. 1 is a diagram of a hydraulic system in the form of a power steering unit for a vehicle embodying the invention.

Referring now to the drawings in greater detail, FIG. 1 is a diagram of a hydraulic system embodying the noise suppressing conduit of the present invention. The system includes a pump 10 driven by a pulley 11 and a V-belt (not shown) from the vehicle engine. Such pumps are usually of the positive displacement type employing rotors or gears, or possibly they may be of the multiple piston type. Such pumps deliver fluid such as oil in pulses and these pulses create the noise in the system. The system includes a servomotor 12 that receives signals from the steering wheel introduced by a suitable linkage 13 into the motor 12. Operation of the linkage 13 activates the motor unit and results in a corresponding motion of the drag link assembly 14 connected to the front wheels for steering. Incorporated in the system is a reservoir 15, and connected between the pump and motor is a noise suppressing conduit 16. This connection is made by means of a fitting 17 threaded into the pump boss to receive a coupling nut 18 rotatably mounted on the adjacent end of the conduit. At the other end of the conduit 16 is an inlet fitting 19 attached to the servomotor 12 that receives a coupling nut 21 mounted on the conduit. The pump has an inlet line 22 leading from the reservoir and there is a motor discharge line 23 leading to the reservoir. There may be bypass valves around the pump, pressure relief valves, excess flow valves and the like in the system, in accordance with the usual practice, but these are not shown or described as they form no part of the present invention.

Figure 2:
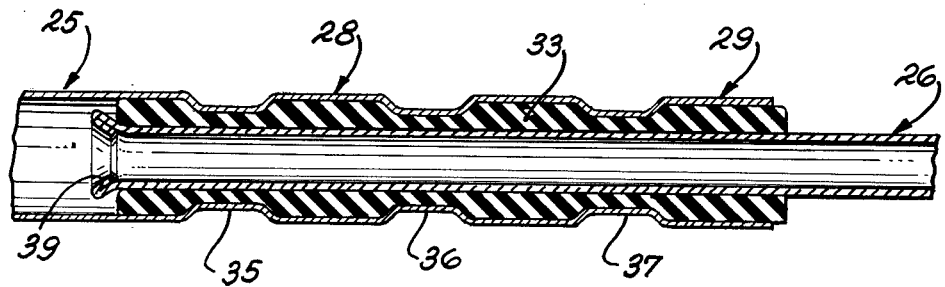
FIG. 2 is a section of the conduit showing the preferred form of joint.

The conduit 16 is formed of two major sections in which section 25 connects to the pump and section 26, in the preferred form of the invention shown in FIGS. 1 and 2, is of a smaller diameter than section 25 and is connected to the motor. These sections are brought together by a noise suppressing joint indicated generally at 28, and at the joint there is, in all forms of the invention, an outer metallic sleeve portion 29 that, as will be seen, backs up a rubber sleeve forming a part of the joint. As can be seen in FIG. 1, a reverse bend 31 is imparted to one section of the conduit 16 in order to accommodate relative motion between the pump 10 located on the engine of the vehicle and the servomotor 12 which will ordinarily be mounted on the vehicle frame. Although the drawing illustrates an arrangement wherein the larger section conduit connects to the pump, this arrangement may be reversed with the larger section conduit connected to the motor without adversely affecting the operation of the invention.

Referring to FIG. 2, it can be seen that section 25 is the larger section and has a length at the joint 28 telescoped over the smaller conduit section 26. Filling the space between the telescoped sections 25 and 26 is a rubber sleeve member 33, which, if liquids such as oil or the like are being used, is preferably formed of an oil resistant rubber such as neoprene. In assembling the joint of FIG. 2, the rubber sleeve 33 is slipped over the end of the smaller conduit section 26 and these parts are telescoped into section 25 whereupon section 25 is crimped at zones 35, 36 and 37 to form the joint. This crimping causes the rubber of the sleeve to flow from under the crimped areas in an axial direction while maintaining a firm resilient grip with the conduit part at the crimped areas. Furthermore, rubber from the crimped areas tends to flow into the spaces between the crimps and thereby produces a firm resilient gripping action on both conduit sections 25 and 26 at these spaces. In order to augment the resistance of the joint to axial separation of conduit section 26 from section 25 as the result of pressure within the system, the end of section 26 is flared at 39 before assembly of this section and the rubber sleeve into section 25. This flare assists in maintaining the otherwise smooth pipe section 26 against axial separation from the joint.

The joint of FIG. 2 at all times maintains the conduit sections 25 and 26 out of contact with one another along the full length of the joint, so that no direct conduction of noise along a metal path can take place. Thus, the rubber sleeve member 33 acts not only as a conduit connecting member, but also as a noise insulator. Because of its ability to accommodate relative axial motion of the conduit sections, the rubber sleeve accommodates in shear, the rubber sleeve accommodates slight variations in length and hence in the resonant frequency of the conduit. This tends to prevent the generation of standing waves within the conduit and thereby render the noise transmitted to the steering column less objectionable than if a solid metal pipe had been employed.

Rubber sleeve 33 also provides for a limited amount of relative rotation of the conduit sections as the rubber sleeve 33 is placed in torsional shear when torsional forces are applied between the conduit sections. This torsional accommodation and the axial accommodation previously described provide additional safety factors by greatly reducing the tendency of the metal conduit parts to crystallize and eventually crack or break in service due to flexing and vibration. Finally, the joint shown in FIG. 2 provides a reduction in the cross-sectional area of the liquid column which further aids in breaking up sustained fundamental and harmonic waves in the liquid generated by pulses that might otherwise be transmitted along the body of liquid itself.

In a typical automotive installation as shown in FIGS. 1 and 2, a 7/16" by .032" wall steel tube 25 is joined by crimping at three zones 35, 36 and 37 to a 1/4" by .028" wall steel tube 26 using a rubber sleeve such as neoprene sleeve 33 having a Durometer hardness of 52 on the Shore A scale. Before assembly the sleeve is 2 3/16" long, with a 1/4" internal diameter and .362–.366" outside diameter. These crimps 35, 36 and 37 of the 7/16" tube are made respectively at 21/32", 1 19/16" and 1 27/32" centers, as measured from the end of the 7/16" tubing 25, and the crimp diameter is .335–.340". Collapse of the 1/4" tube can be prevented by the insertion of a mandrel within the smaller tube. The end of the 1/4" steel tube is double flared as indicated at 39 in FIG. 2 to improve the resistance of the assembly to separation under the axial forces created by fluid pressure. A joint formed in accordance with this invention will resist axial separation under operating conditions, and in fact, the joint is so strong that it will resist axial separation to a degree wherein one or the other of the metal tubes will burst, as under destructive tests, before the joint comes apart. It will be understood that these dimensions and other data are given merely as an example of a typical construction and are not intended to be limiting.

Figure 3:
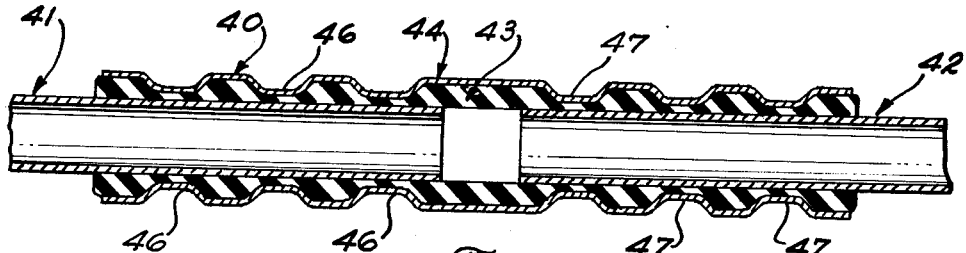
FIG. 3 shows another embodiment of the joint wherein a separate metal sleeve is provided to back up the rubber sleeve.

FIG. 3 shows a form of the invention wherein two aligned conduits are connected by the rubber sleeve in a separate metal back up sleeve 44. Here the joint 40 joining the conduit section 41 to another conduit section 42 of the same diameter includes a relatively long rubber sleeve 43 that surrounds the ends of the conduit sections. The ends of the conduit sections 41 and 42 are spaced axially from one another to insure that there will be no metal-to-metal contact between these conduit sections. A metal sleeve 44 surrounds rubber sleeve 43 and this sleeve is crimped at spaced zones 46 against the conduit section 41 and at similarly spaced zones 47 to the other conduit section 42. The mode of operation of this embodiment is like that of the one previously described, except that the change in section of the conduit at the joint occurs in the zone between the conduit sections 41 and 42 where the inner diameter of the rubber sleeve 43 and hence the outer diameters of the conduits 41 and 42 determine the effective section at this point.

Figure 4:
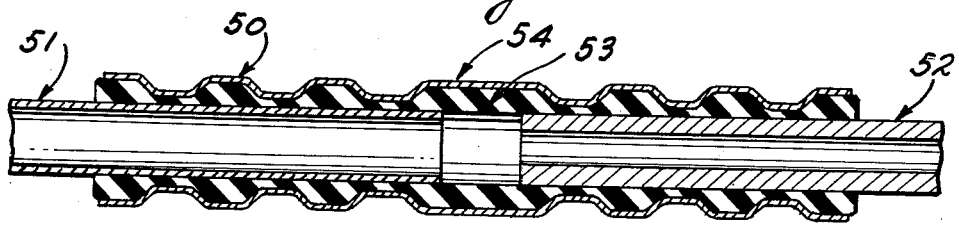
FIG. 4 shows a modification of the embodiment of FIG. 3 employing a reduced section conduit.

If a permanent change in section of the fluid conducting bores of the pipes is desired in a joint of the type shown in FIG. 3, the form of FIG. 4 may be adopted. As shown therein, the joint 50 between the conduits 51 and 52 is formed by a rubber sleeve 53 and a surrounding metal sleeve 54. The one conduit 52 has the same outer diameter as that of the other conduit section 51, but is formed with a thicker wall so that the effective cross section of the fluid column in conduit 52 is less than that in conduit 51.

Figure 5:
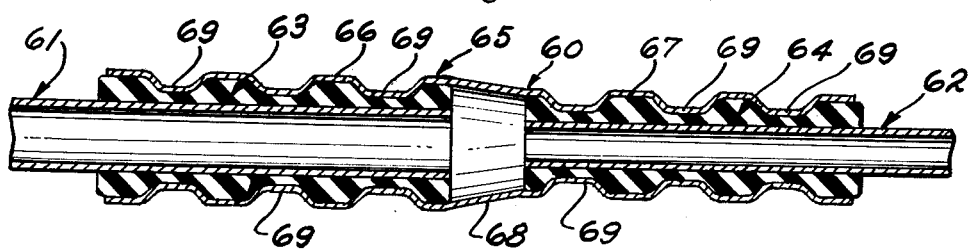
FIG. 5 is still another embodiment wherein the separate sleeve is itself formed to accommodate the reduced sections.

The joint of FIG. 5 is in some respects like that of FIG. 4 in that there is a reduction in cross section at the joint, but here, as in FIG. 2, the two tubes have approximately the same wall thickness. In this joint 60, the two conduit sections 61 and 62 can be like those of the form of FIG. 2, except that they are not telescoped together but are spaced apart end to end as in FIGS. 3 and 4. Here, two rubber sleeve members 63 and 64 are provided, with sleeve member 63 fitting over the end of conduit section 61 and the other sleeve member 64 over the end of conduit section 62. The metal sleeve 65 is different from that of FIGS. 3 and 4. It is formed with a large diameter straight section 66 that surrounds the rubber sleeve 63 on conduit section 61, and with a smaller diameter section 67 that surrounds the rubber sleeve 64 on conduit section 62. The sleeve 65 has a reducing or conical intermediate section 68 that joins straight portion 66 and 67 between the ends of the conduit sections 61 and 62. The crimp arrangement at each conduit section indicated at 69 is like that in the previously described embodiments. The mode of operation of this form of the invention is like that of FIGS. 2 and 4. In the embodiments of FIGS. 3, 4 and 5 there is somewhat more axial and torsional accommodation because of the additional amount of rubber employed in these embodiments. However, in each case there is a noise suppressing change or variation in the conduit cross section within the joint.

Figure 6:
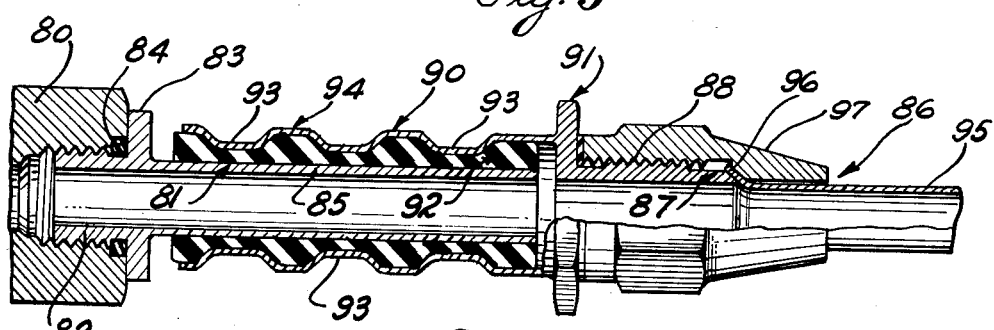
FIG. 6 is yet another embodiment wherein the joint between the conduit parts is incorporated in a fitting.

In the form shown in FIG. 6, the joint between the conduit sections is incorporated in a fitting forming part of the conduit when the conduit is completely assembled into the hydraulic system. In this form element 80 is a boss extending from either the pump or motor housing. There is a nipple or steel pipe 81 threaded at one end 82 into the boss 80. This nipple has a flange 83 formed to receive a wrench thereon. A rubber sealing gasket 84 is received in a suitable pocket in the parts to seal the joint. The nipple 81 has a conduit section 85 extending outwardly past flange 83 to form one of the conduits of the joint. The other conduit section 86 includes a sleeve member indicated generally at 87 having a threaded end 88 including a sleeve portion 90 and a flanged wrench receiving portion 91. A rubber sleeve 92 surrounds the end of conduit section 85 and is telescoped within the sleeve portion 90 on the other conduit section 86. Sleeve portion 90 is crimped at spaced zones 93 to form the joint 94 as will be understood from the previous description. The remainder of the conduit section 86 includes a tube or pipe 95 which may be of smaller diameter than that of the conduit section 85, if desired. Pipe or tube 95 can be flared as at 96 for carrying a coupling nut 97 threaded into threads 88 formed on sleeve member 87 in the manner well known in the art. This form of the invention presents the advantage that the position of the conduit involving the noise suppressing joint, which is the only non-standard part of the conduit assembly, can be made up specially as a compact fitting unit which when applied to conventional parts of a hydraulic system produces a conduit assembly having the features of the invention.

As pointed out above, it is necessary to insulate the conduits one from the other, and this is accomplished by crimping a metal part or sleeve against the rubber sleeve which, in turn, is pressed against the smooth conduit or inner member. Now when rubber or other resilient materials, including such plastic materials as polyvinyl chloride, polyethylene, and the like, are confined, these materials behave somewhat in the manner of a fluid in that they cold flow or permanently deform under pressure. As a result of this feature the insulating joint of this invention is strong enough to resist axial separating forces found in the fluid pressure systems even though the inner conduit part is smooth and undistorted.

The above described feature is employed to advantage by the confining of the material during the crimping operation so as to produce a strong joint. To this end, it is preferable that a certain order or arrangement of the crimping steps applied to the outer conduit or sleeve member be made. It has been found that in the preferred embodiment of the invention where more than two crimps are imparted to the outer sleeve, the end or terminal crimping zones should be the first zones crimped. These outer crimp zones then serve to partially confine the rubber or plastic material of the insulating sleeve so that, when one or more intermediate crimps are made, the partial axial confinement of the resilient material creates a powerful and effective gripping action against the conduit or sleeve parts. For example, in FIG. 2, the joint is preferably formed by crimping first the left hand area indicated at 35 after which the right hand area indicated at 37 is crimped, or alternatively, these areas 35 and 37 can be crimped at the same time. After this has been done, the intermediate area 36 is crimped. When this operation is performed, since the resilient material of the sleeve is partially confined by the end crimps, a compression pressure is developed in the resilient sleeve resulting in a powerful gripping force against the inner conduit. This pressure within the resilient material of the sleeve causes the material to come into intimate contact with the surface of the inner tube or conduit member so that the sleeve tends to adhere to this member. If a tensile load is now applied to the assembly between the inner and outer conduit members, the end of the rubber sleeve becomes wedged between the adjacent portion of the inner tube member and adjacent crimped zone, tending to increase the gripping force and pressure between the rubber sleeve and the inner diameter tube. Thus the joint between the rubber sleeve and the inner tube becomes tighter as greater tensile force is applied between the members, and the ultimate strength of the joint depends not upon the adhesion between the rubber sleeve aand the inner conduit member, but rather upon the shear strength of the rubber sleeve separating the inner and outer conduit members.

It will be seen that all forms of the invention reduce noise transmission along the conduit, suppress the generation of noise within the conduit and also accommodate axial and torsional motion. While several modifications and embodiments of the invention have been shown and described in detail, it is understood that the invention is not limited to these particular forms, and that various other modifications will readily occur to those skilled in the art upon a full comprehension of the invention as defined in the following claims.

What is claimed is:

1. A conduit for use in a fluid system having a pulsating fluid flowing therethrough comprising first and second metallic tubes and a noise suppressing joint between said tubes providing a change in conduit diameter and allowing relative axial movement between the tubes, said first tube having an outer diameter approximately half the inner diameter of said second tube, said first tube being telescoped within said second tube at said joint, a sleeve of rubber extending along the radial space between said tubes, said sleeve having a normal wall thickness substantially equal to the radial space between said tubes, said sleeve having an open end face at its inner end exposed to fluid pressure in said conduit, said second tube being crimped at least twice at axially spaced zones to reduce the rubber sleeve to about half its normal thickness in said zones and to place the rubber between the crimped zones in compression to bond the rubber to the tubes whereby the rubber is placed in shear by relative axial movement between the tubes.

2. A conduit set forth in claim 1 wherein said second tube is crimped at a third axially spaced zone by an amount to reduce the sleeve to about half its normal thickness in said third zone to place the rubber between the outer two zones under additional compression.

3. A conduit as set forth in claim 1 wherein the inner end of said first tube extends axially inward beyond the inner end of said rubber sleeve within said conduit and has an end portion flared outward to have a diameter substantially greater than the normal outer diameter of said first tube and substantially less than the inner diameter of said second tube.

4. A conduit set forth in claim 1 wherein said rubber sleeve has an axial length at least as great as the length of the portion of said first tube telescoped within said second tube.

References Cited in the file of this patent

UNITED STATES PATENTS

| | | |
|---|---|---|
| 1,911,775 | Smith et al. | May 30, 1933 |
| 1,911,866 | Wylie | May 30, 1933 |
| 1,920,436 | Riker | Aug. 1, 1933 |
| 1,930,067 | Tibbetts | Oct. 10, 1933 |
| 2,014,355 | Hussman | Sept. 10, 1935 |
| 2,267,085 | Dezendorf | Dec. 23, 1941 |
| 2,684,692 | Hunter et al. | July 27, 1954 |
| 2,828,537 | Pischke | April 1, 1958 |

FOREIGN PATENTS

| | | |
|---|---|---|
| 593,470 | Germany | Feb. 28, 1934 |
| 1,225,189 | France | Feb. 15, 1960 |